(12) United States Patent
Pelsoeczy

(10) Patent No.: US 8,580,048 B2
(45) Date of Patent: Nov. 12, 2013

(54) STEEL MATERIAL COMPOSITION FOR PRODUCING PISTON RINGS AND CYLINDER SLEEVES

(75) Inventor: Laszlo Pelsoeczy, Burscheid (DE)

(73) Assignee: Federal-Mogul Burscheid GmbH, Bruscheid (DE)

( * ) Notice: Subject to any disclaimer, the term of this patent is extended or adjusted under 35 U.S.C. 154(b) by 230 days.

(21) Appl. No.: 13/203,559

(22) PCT Filed: Oct. 12, 2009

(86) PCT No.: PCT/EP2009/007319
§ 371 (c)(1),
(2), (4) Date: Aug. 26, 2011

(87) PCT Pub. No.: WO2010/097103
PCT Pub. Date: Sep. 2, 2010

(65) Prior Publication Data
US 2011/0311390 A1    Dec. 22, 2011

(51) Int. Cl.
*C22C 38/20*    (2006.01)
(52) U.S. Cl.
USPC .............................................. 148/221; 420/9
(58) Field of Classification Search
USPC ............... 148/9, 321, 333, 368, 325, 38, 221;
420/90, 34, 61, 60, 63, 67, 69, 9;
164/47
See application file for complete search history.

(56) References Cited

U.S. PATENT DOCUMENTS

| 4,966,751 A * | 10/1990 | Kaede et al. ..................... 420/34 |
| 2002/0005616 A1 | 1/2002 | Kubota et al. |
| 2006/0191508 A1 * | 8/2006 | Otsuka et al. ................ 123/193.6 |
| 2010/0189588 A1 | 7/2010 | Kawatsu et al. |
| 2010/0192895 A1 | 8/2010 | Pelsoeczy |

FOREIGN PATENT DOCUMENTS

| JP | 07278742 A | 10/1995 |
| RU | 2 336 364 C1 | 10/2008 |
| WO | 2008/019716 A | 2/2008 |

* cited by examiner

*Primary Examiner* — Scott Kastler
*Assistant Examiner* — Michael Aboagye
(74) *Attorney, Agent, or Firm* — Robert L. Stearns; Dickinson Wright, PLLC

(57) ABSTRACT

The invention relates to a steel material composition, in particular for producing piston rings and cylinder sleeves, containing the following elements in the given fractions in relation to 100% by weight of the steel material: 0.5-1.2% by weight C, 6.0-20.0% by weight Cr, 45.0-88.5% by weight Fe, 3.0-15.0% by weight Mn and 2.0-10.0% by weight Si. Said composition can be produced by melting the starting materials and casting the melt in a pre-fabricated mold.

4 Claims, No Drawings

US 8,580,048 B2

STEEL MATERIAL COMPOSITION FOR PRODUCING PISTON RINGS AND CYLINDER SLEEVES

BACKGROUND OF THE INVENTION

1. Technical Field

The present invention relates to a steel material composition that is suitable particularly for producing piston rings and cylinder sleeves. The present invention further relates to a method for manufacturing the steel material composition according to the invention. Finally, the present invention relates to piston rings and cylinder sleeves that comprise the steel material compositions as the basic elements thereof.

2. Related Art

Piston rings in a combustion engine seal the gap that exists between the piston head and the cylinder wall off from the combustion chamber. As the piston moves up and down, the outer peripheral surface of the piston ring slides along the cylinder wall in permanently spring-biased contact therewith, while the piston ring itself oscillates as it travels in its piston ring groove due to the tilting movements of the piston, and this oscillation causes the flanks of the ring come into contact alternatingly with the upper and lower flanks of the piston ring groove. As the two elements slide over one another, each is subject to a certain amount of wear depending on the nature of the material, and in the event of dry running this can lead to seizing, scoring and ultimately cause irreparable damage to the engine. In order to improve the sliding and wearing behaviour of piston rings with respect to the cylinder wall, the peripheral surfaces of the piston rings have been coated with various materials.

In the case of cylinder sleeves such as those used in reciprocating piston internal combustion engines, a high degree of wear resistance must be assured, otherwise, that is to say as the cylinder sleeve becomes thinner, gas leakage and oil consumption may increase and the performance of the engine will deteriorate. As the cylinder sleeve becomes worn, the gap between the cylinder wall and the cylinder sleeve becomes steadily larger, with the result that combustion gases are able to escape past the cylinder sleeve more easily (referred to as "blow-by"), which in turn reduces engine efficiency. Because of the enlarged gap, the oil film that is not stripped off and is left in the combustion chamber becomes thicker, with the result that more oil can be lost per unit of time, effectively increasing oil consumption.

The parts of internal combustion engines that are exposed to high stresses, such as piston rings and cylinder sleeves, are usually made from cast iron materials or cast iron alloys. Piston rings and particularly compression rings in high-performance engines are exposed to increasing stresses, including peak compression pressure, combustion temperature, EGR and lubrication film reduction among others, and which have a critical effect on their functional properties, such as wear scuff resistance, microwelding and corrosion resistance.

Unfortunately, cast iron materials according to the prior art are highly susceptible to breakage, and rings often break when the existing materials are used. Higher mechanical-dynamic loads result in shorter operating lives for piston rings and cylinder sleeves. Running surfaces and flanks are subject to heavy wear for the same reasons. Higher ignition pressures, reduced emissions and direct fuel injection contribute to increased loads on the piston rings. As a result, the piston material is damaged and deposits accumulate on it, particularly on the lower piston ring flank.

Having to deal with higher mechanical and dynamic loads on piston rings and cylinder sleeves, more and more engine manufacturers are requesting piston rings and cylinder sleeves that are made from high-grade steel (annealed and high-alloyed, such as the material 1.4112). In this context, iron materials containing less than 2.08% by weight carbon are classified as steel. If the carbon content is higher, the material is considered to be cast iron. Steel materials have better strength properties and ductile values than cast iron because their microstructures are not disrupted by free graphite.

The steels used most frequently to produce steel piston rings or cylinder sleeves are high chrome alloy, martensitic steels. Steel piston rings are manufactured from profile wire. The profile wire is roundwound, cut to length and drawn over an "out-of-round" mandrel. On this mandrel, the piston ring is given its desired out-of-round shape in an annealing process, which also sets up the requisite tangential forces. A further disadvantage of manufacturing piston rings from steel is that above a certain diameter, it is no longer possible to produce (wind) rings from steel wire. In contrast, cast iron piston rings are already cast out of round, so they are ideally shaped from the outset.

Cast iron has a considerably lower melting temperature than steel. The difference may be as much as 350° C. depending on chemical composition. Cast iron is therefore easier to melt and cast, since a lower melting temperature means a lower casting temperature and thus also less shrinkage due to cooling, so that the case material has few blowholes and/or hot or cold cracks. A lower casting temperature also generates less stress on the moulding material (erosion, gas porosities, sand inclusions) and the furnace as well as lower melting costs.

The melting temperature of the iron material depends not only on its carbon content but also on the "degree of saturation". The following formula, shown in simplified form, applies:

$$S_c = C/(4.26 - 1/3(Si+P)).$$

The closer the degree of saturation is to 1, the lower the melting temperature is. In the case of cast iron, a degree of saturation of 1.0 is usually aimed for, wherein the cast iron has a melting temperature of 1150° C. The degree of saturation of steel is about 0.18 depending on its chemical composition. Eutectic steel has a melting temperature of 1500° C.

The degree of saturation can be influenced considerably by the Si or P content. For example a 3% by weight increase in silicon content has a similar effect to a 1% by weight increase in C content. It is thus possible to produce a steel material having a C content of 1% by weight and 9.78% by weight silicon that has the same melting temperature as cast iron with a degree of saturation of 1.0 (C: 3.26% by weight, Si: 3.0% by weight).

If the Si content is increased significantly, the degree of saturation of the steel material may also be increased and the melting temperature lowered to the same level as cast iron. In this way, it is possible to produce steel using the same equipment as is used to produce cast iron, for example GOE 44.

Piston rings and cylinder sleeves made from a steel casting material with high silicon and chromium content are known in the prior art. However, the presence of a larger quantity of silicon and chromium has a negative effect on the hardenability of the material, because its "Ac3" austenitic conversion temperature is raised.

BRIEF DESCRIPTION OF THE INVENTION

In view of the above, the object of the present invention is to provide a steel material composition with high silicon and chromium content, particularly for producing piston rings and cylinder sleeves, having improved hardness. Due to its production in a gravity casting process, the steel material composition should improve on the properties of annealed cast iron with spheroidal graphite with respect to at least one of the following parameters:

Mechanical properties such as e-modulus, bending strength
Resistance to breakage
Mechanical stability
Flank wear
Running surface wear This object is solved according to the invention with a steel material composition including the following elements in the proportions indicated:
C: 0.5-1.2% by weight
Cr: 6.0-20.0% by weight
Fe: 45.0-88.5% by weight
Mn: 3.0-15.0% by weight
Si: 2.0-10.0% by weight The content substances are contained in such manner that the sum of all starting materials, components, content substances, elements and additives, whether indicated specifically or not explicitly named, is equal to 100% in all cases. The proportion of starting materials, components, content substances, elements and additives may be adjusted by various methods known to one skilled in the art. The chemical composition is adjusted with particular reference to the workpiece to be produced.

The manganese contained functions as an austenite former that extends the gamma range and shifts the Ac3 austenitic conversion temperature upwards. In this way, improved hardenability of the steel material is achieved according to the invention.

The following elements are contained in the steel material composition according to the invention preferably in proportions not exceeding the values indicated relative to 100% by weight of the material composition:

| | |
|---|---|
| Al: max. 0.02% by weight | P: max. 0.1% by weight |
| B: max. 0.1% by weight | S: max. 0.05% by weight |
| Cu: max. 2.0% by weight | Sn: max. 0.05% by weight |
| Mo: max. 3.0% by weight | Ti: max. 1.5% by weight |
| Nb: max. 0.05% by weight | V: max. 1.5% by weight |
| Ni: max. 2.0% by weight | W: max. 1.5% by weight | wherein the sum of the fractions of Nb, Ti, V and W does not exceed 1.5% by weight.

It is further preferred according to the invention that the steel material composition according to the invention contains only elements selected from the group consisting of Al, B, C, Cr, Cu, Fe, Mn, Mo, Nb, Ni, P, S, Si, Sn, Ti, V and W, and that the sum of these elements is equal to 100% by weight.

DETAILED DESCRIPTION

The steel material composition according to the invention reduces the susceptibility of workpieces made therefrom to become deformed in the presence of extreme heat, thus ensuring high performance capability for the long term and also reducing oil consumption. Because of its excellent properties, the steel material composition according to the invention is therefore ideally suitable for the production of piston rings and cylinder sleeves in the automotive and LB fields, or for valve seat inserts and guides. Additionally, drive seals, carrier plates for brake linings on disc brakes (black plates) and rings for cooling units, pump nozzles and cylinder sleeves (liners) as well as shaft sleeves and parts for the chemical industry may be manufactured.

The steel material composition according to the invention also has the advantage that it thus becomes possible to manufacture steel piston rings and cylinder sleeves, for example, using the machinery and technologies that are normally used for manufacturing cast iron workpieces. Moreover, the production costs are equivalent to those for cast iron piston rings, affording the manufacturer a cost advantage and improved value creation. The material parameters are also adjustable independently of the supplier.

A method for producing a steel material composition according to the invention is also provided according to the invention, which method includes the following steps:
a. Producing a melt from the starting materials, and
b. Pouring the melt into a prefabricated mould.

Steel scrap, recycled material and alloys, for example, may be used as starter materials. The smelting process takes place in a furnace, preferably a cupola furnace. Following this, the melt is allowed to solidify to produce a blank. The blank may be cast using methods known in the related art, such as centrifugal casting, continuous casting, punch pressing methods, Croning, or preferably green sand moulding.

After the steel material composition has cooled, the form is emptied and the blank obtained is cleaned.

If necessary, the blank may then be annealed. This is done in the following steps:
c. Austenitising the steel material composition above its Ac3 temperature,
d. Quenching the steel material composition in a suitable quenching medium, and
e. Tempering the steel material composition at a temperature in the range from 400 to 700° C. in a controlled atmosphere furnace.

Oil is preferably used as the quenching medium.

To harden the steel material composition according to the invention further, the steel material composition obtained thereby may be nitrided following the process steps described in the preceding. This may be performed for example by gas nitriding, plasma nitriding or pressure nitriding.

The following example explains the invention without being limited thereto.

EXAMPLE

A piston ring was produced from a steel material composition according to the invention having the following composition:

| | |
|---|---|
| Al: 0.002% by weight | P: 0.03% by weight |
| B: 0.007% by weight | S: 0.009% by weight |
| C: 0.9% by weight | Si: 3.0% by weight |
| Cr: 13.0% by weight | Sn: 0.001% by weight |
| Cu: 0.05% by weight | Ti: 0.011% by weight |
| Mn: 4.0% by weight | V: 0.025% by weight |
| Mo: 0.5% by weight | W: 0.015% by weight |
| Nb: 0.002% by weight | Fe: Remainder |

This was done by producing a melt of the starter materials (steel scrap, recycled material and alloys), and pouring the melt into a prefabricated green sand mould. Then, the mould was emptied and the piston ring thus obtained was cleaned. The piston ring was then annealed. This is achieved by austenitising above the Ac3 temperature of the steel material composition, quenching in oil, and tempering in a controlled atmosphere furnace at a temperature in the range from 400 to 700° C.

The invention claimed is:

1. A piston ring having a cast steel material composition as the basic element, wherein the steel material composition consists of the following elements in the proportions indicated relative to 100% by weight of the steel material composition:
C: 0.5-1.2% by weight
Cr: 6.0-20.0% by weight
Mn: 4.0-15.0% by weight
Si: 2.0-10.0% by weight
Al: max. 0.02% by weight
B: max. 0.1% by weight
Cu: max. 2.0% by weight
Mo: max. 3.0% by weight
Nb: max. 0.05% by weight
Ni: max. 2.0% by weight
P: max. 0.1% by weight
S: max. 0.05% by weight
Sn: max. 0.05% by weight
Ti: max. 1.5% by weight
V: max. 1.5% by weight
W: max. 1.5% by weight
wherein the total of the fractions of Nb, Ti, V and W is equal to not more than 1.5% by weight, and Fe is the remainder.

2. A method for producing a piston ring comprising:
a. Producing a melt from a steel material composition consisting of:
C: 0.5-1.2% by weight
Cr: 6.0-20.0% by weight
Mn: 4.0-15.0% by weight
Si: 2.0-10.0% by weight
Al: max. 0.02% by weight
B: max. 0.1% by weight
Cu: max. 2.0% by weight
Mo: max. 3.0% by weight
Nb: max. 0.05% by weight
Ni: max. 2.0% by weight
P: max. 0.1% by weight
S: max. 0.05% by weight
Sn: max. 0.05% by weight
Ti: max. 1.5% by weight
V: max. 1.5% by weight
W: max. 1.5% by weight
wherein the total of the fractions of Nb, Ti, V and W is equal to not more than 1.5% by weight, and Fe is the remainder; and
b. Casting the melt into a prefabricated form.

3. The method of claim 2, further including:
c. Austenitising the piston ring above its Ac3 temperature,
d. Quenching the piston ring in a suitable quenching medium, and
e. Tempering the piston ring at a temperature in the range from 400 to 700° C. in a controlled atmosphere furnace.

4. The method as recited in claim 3, further including the following step:
f. Nitriding the piston ring obtained.

* * * * *